United States Patent
Lin

(10) Patent No.: US 9,444,956 B2
(45) Date of Patent: Sep. 13, 2016

(54) METHODS FOR GENERATING AND MANIPULATING THE GROUPED PHOTOS AND APPARATUSES USING THE SAME

(71) Applicant: Wistron Corp., New Taipei (TW)

(72) Inventor: Zhao-Yuan Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 38 days.

(21) Appl. No.: 14/562,634

(22) Filed: Dec. 5, 2014

(65) Prior Publication Data

US 2015/0264218 A1  Sep. 17, 2015

(30) Foreign Application Priority Data

Mar. 12, 2014 (TW) .............................. 103108600 A

(51) Int. Cl.
*H04N 5/76* (2006.01)
*H04N 1/00* (2006.01)

(52) U.S. Cl.
CPC ...... *H04N 1/00453* (2013.01); *H04N 1/00411* (2013.01); *H04N 2201/3214* (2013.01); *H04N 2201/3215* (2013.01); *H04N 2201/3247* (2013.01)

(58) Field of Classification Search
CPC ..... H04N 1/2112; H04N 5/76; G06F 17/302
See application file for complete search history.

(56) References Cited

U.S. PATENT DOCUMENTS

| | | | | |
|---|---|---|---|---|
| 5,819,103 | A * | 10/1998 | Endoh .................. | G06F 3/0481 345/629 |
| 6,819,356 | B1 * | 11/2004 | Yumoto ............ | G06F 17/30265 348/231.2 |
| 7,991,234 | B2 * | 8/2011 | Hamasaki ......... | G06F 17/30265 382/224 |
| 8,031,238 | B2 * | 10/2011 | Uchiyama ............. | H04N 5/232 348/113 |
| 8,818,139 | B2 * | 8/2014 | Bae ................... | G06F 17/30241 382/100 |
| 8,891,832 | B2 * | 11/2014 | Tseng ..................... | G06Q 50/01 382/118 |

FOREIGN PATENT DOCUMENTS

| | | |
|---|---|---|
| TW | 200523761 A | 7/2005 |
| TW | 201001187 A | 1/2010 |
| TW | 201022831 A | 6/2010 |
| TW | 200739414 A | 10/2012 |

OTHER PUBLICATIONS

Taiwan Patent Office, Office Action, Patent Application Serial No. 103108600, Nov. 10, 2015, Taiwan.

* cited by examiner

*Primary Examiner* — Aung S Moe
*Assistant Examiner* — John H Morehead, III

(57) ABSTRACT

The invention introduces a method for generating and manipulating grouped photos, executed by a processing unit, which contains at least the following steps. Photos shot in a geometric region are selected from a storage unit, and shooting dates thereof are read. Time intervals between every two adjacent shooting dates are calculated, and CDFGs (Continuous Data-time Fragment Groupings) are generated accordingly. For each CDFG comprising two or more shooting dates, a total number of photos associated with each shooting date is obtained, and one or more groups are generated accordingly. Information regarding the groups is displayed in a map to help a user to search and browse photos.

18 Claims, 11 Drawing Sheets

METHODS FOR GENERATING AND MANIPULATING THE GROUPED PHOTOS AND APPARATUSES USING THE SAME

CROSS REFERENCE TO RELATED APPLICATIONS

This application claims priority of Taiwan Patent Application No. 103108600, filed on Mar. 12, 2014, the entirety of which is incorporated by reference herein.

BACKGROUND

1. Technical Field

The present invention relates to the MMI (Man-machine interface) interaction, and in particular, to methods for generating and manipulating the grouped photos and apparatuses using the same.

2. Description of the Related Art

Typically, photos that are shot are stored in a storage device in sequence according to the time the photo was taken or serial numbers which generate by camera automatically. However, this can make it difficult for users to search for a desired photo. Specifically, with the aforementioned photo organization, users need to search for photos by referring to the images icons along their shooting time from the beginning. It consumes excessive time to conduct a search due to the stored photos are in the thousands or even more. Thus, it is desirable to have methods for generating and manipulating grouped photos and apparatuses using the same to reduce search time, thereby improving the user satisfaction.

BRIEF SUMMARY

An embodiment of the invention introduces a method for generating and manipulating grouped photos, executed by a processing unit, which contains at least the following steps. Photos shot in a geometric region are selected from a storage unit, and the shooting dates thereof are read. Time intervals between every two adjacent shooting dates are calculated, and CDFGs (Continuous Data-time Fragment Groupings) are generated accordingly. For each CDFG comprising two or more shooting dates, the total number of photos associated with each shooting date is obtained, and one or more groups are generated accordingly. Information regarding the groups is displayed in a map to help a user to search and browse photos. Each CDFG having only one shooting date forms a group in itself.

An embodiment of the invention introduces an apparatus for generating and manipulating grouped photos, which contains at least a storage unit, a display unit and a processing unit. The processing unit selects photos shot in a geometric region from the storage unit; reads the shooting dates thereof; calculates time intervals between every two adjacent shooting dates; generates CDFGs according to the time intervals; for each CDFG comprising two or more shooting dates, obtains the total number of photos associated with each shooting date and generates one or more groups accordingly; and displays information regarding the groups in a map on the display unit to help a user to search and browse photos. Each CDFG having only one shooting date forms a group in itself.

Another embodiment of the invention introduces a method for generating and manipulating grouped photos, executed by a processing unit, which contains at least the following steps. A map is displayed on a display unit, wherein the map is divided by rectangles and each rectangle is associated with a geometric region. After it is detected that one of the rectangles has been clicked, photos, which were shot in the associated geometric region, are selected from a storage unit. The photos are merged according to the shooting dates thereof so as to generate groups. Information regarding the groups is displayed to help a user to search and browse photos.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
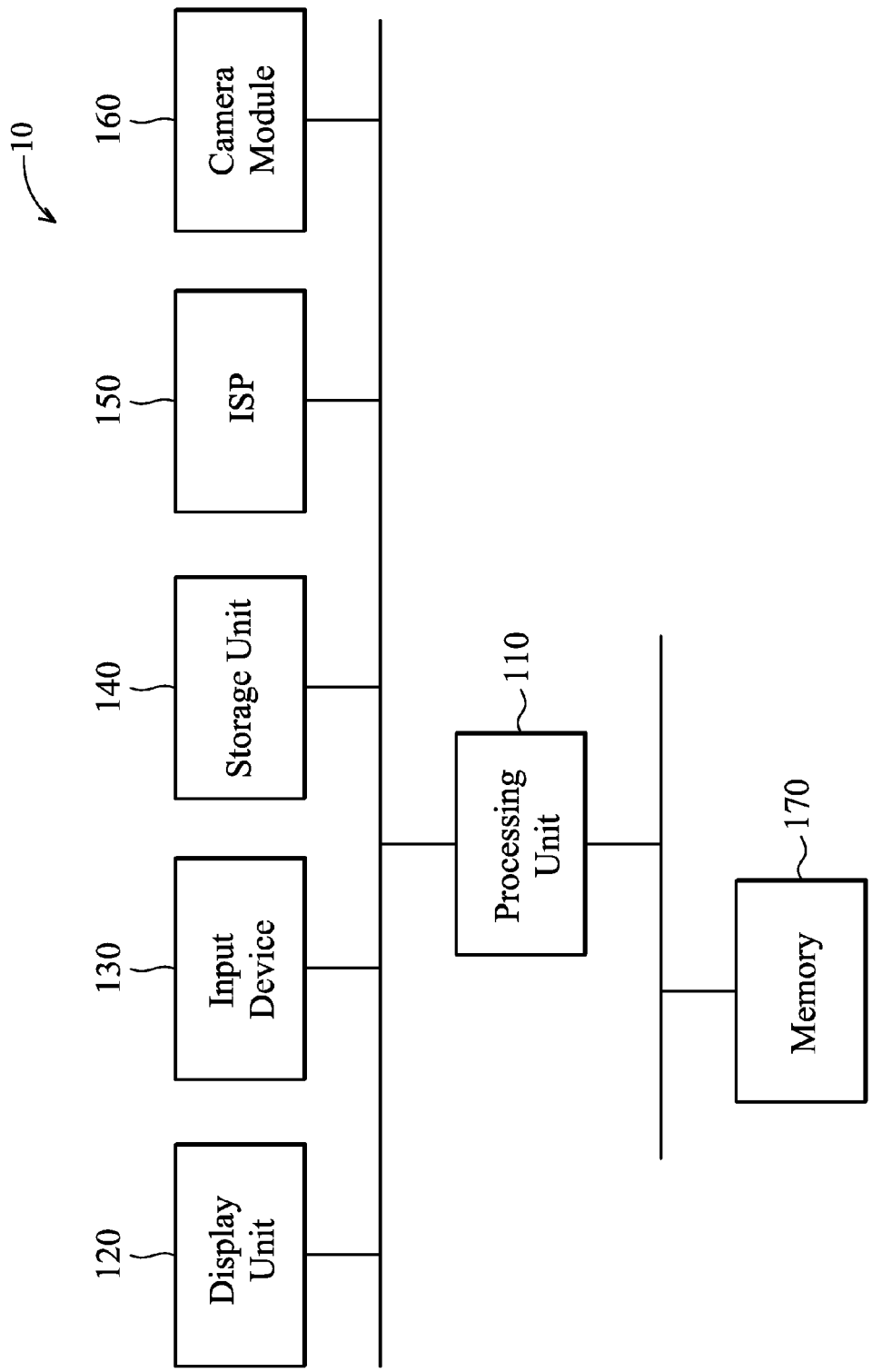
FIG. 1 is the system architecture of an electronic device according to an embodiment of the invention.

FIG. 1 is the system architecture of an electronic device according to an embodiment of the invention. The system architecture may be implemented in a digital camera, a mobile phone, a tablet computer, a desktop computer or a notebook computer, which at least includes a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The electronic device 10 further includes a memory 170 for storing necessary data in execution, such as variables, data tables, or others, and a storage unit 140 for storing a wide range of electronic files, such as photos, text, or others. The system architecture further includes one or more input devices 130 to receive user input, such as a keyboard, a mouse, a touch panel, or others. A user may press hard keys on the keyboard to input characters, control a cursor on a display by operating the mouse, or control an executed application with one or more gestures made on the touch panel. The gestures include, but are not limited to, a single-click, a double-click, a single-finger drag, and a multiple finger drag. A display unit 120, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for a user to view. The system architecture further includes a camera module 160 including an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. The readout electronic circuits provide raw image data to an ISP (image signal processor) 150, and the ISP 150 converts the raw image data into the specified format and enlarges or reduces the converted images to the predefined resolution for outputting to the display unit 120, or converts the raw image data into the compressed or uncompressed format, such as those described in the standard defined by JPEG (Joint Photographic Experts Group), TIFF (Tagged Image File Format), and extensions of such standards.

Figure 2:
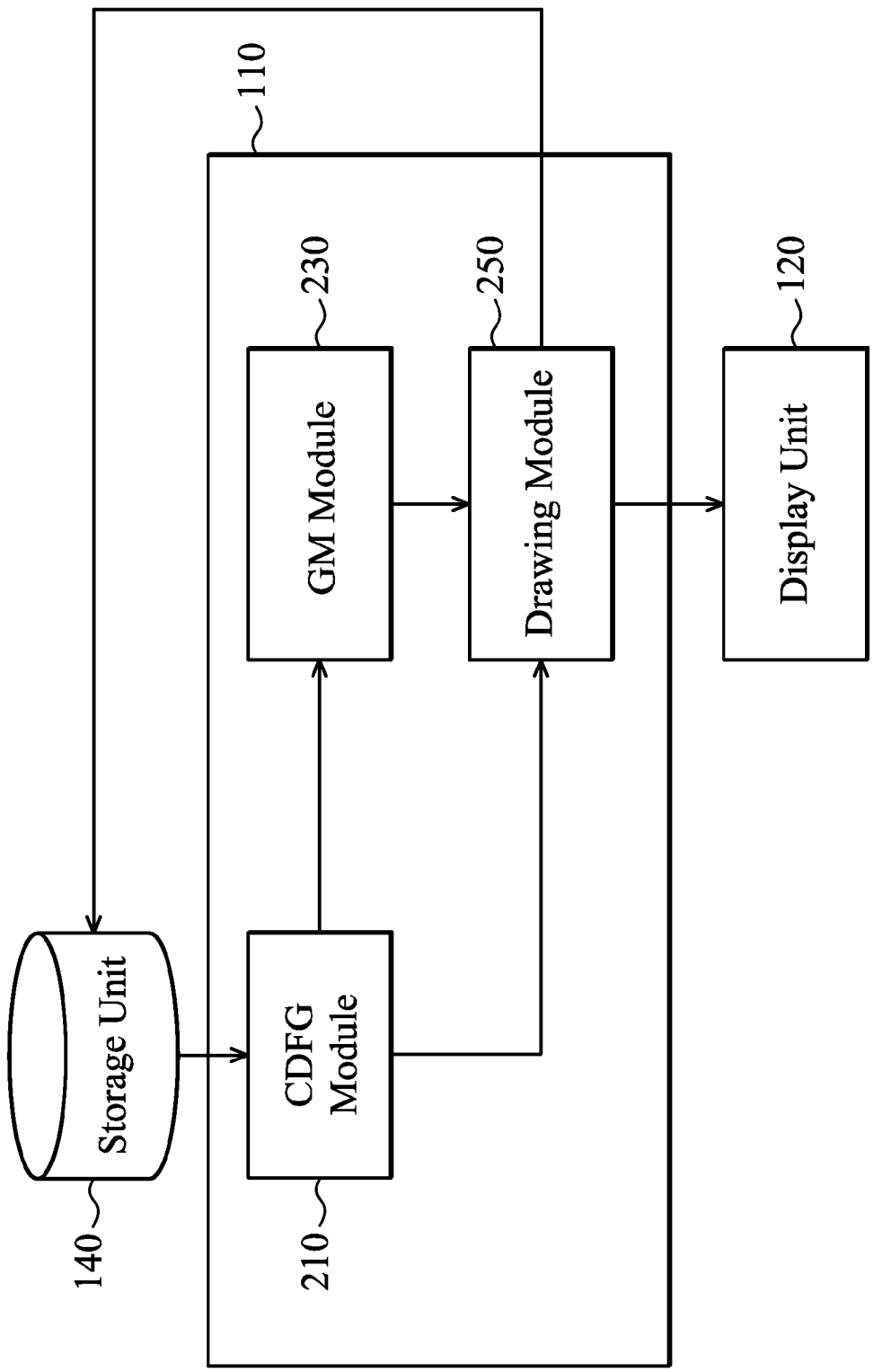
FIG. 2 illustrates the system architecture for generating grouped photos and interacting therewith according to an embodiment of the invention.

FIG. 2 illustrates the system architecture for generating grouped photos and interacting therewith according to an embodiment of the invention. The processing unit 110 may provide the functionality of generating grouped photos and interacting therewith when loading and executing software code or instructions of the CDFG (Continuous Data-time Fragment Grouping) module 210, the GM (Group-Merging) module 230 and the drawing module 250. The storage unit 140 stores photos and profile data related to each photo. The profile data may be stored in the EXIT (EXchangeable Image File) format, thereby enabling the CDFG module 210 to obtain sufficient information for grouping. An example of profile data in the EXIT format is shown in table 1 as follows.

TABLE 1

| Item | Value |
|---|---|
| Orientation | Normal (upper-left) |
| Resolution X | 300 |
| Resolution Y | 300 |
| Resolution unit | dpi |
| Last updated time | 2005:10:06 12:53:19 |
| Exposure | 0.00800 (1/125) sec |
| Aperture value | F22 |
| Shooting mode | Aperture prioritized |
| ISO value | 100 |
| EXIF version | 30, 32, 32, 31 |
| Shooting time | 2005:09:25 15:00:18 |
| Storing time | 2005:09:25 15:00:18 |
| Color Space | sRGB |
| Image size X | 5616 pixel |
| Image size Y | 3744 pixel |
| Shooting place | 25.061207, 121.647402 |

The CDFG module 210, for each photo, may obtain the shooting time from the shooting time item, and the latitude and longitude of the shooting place from the shooting place item.

Figure 3:
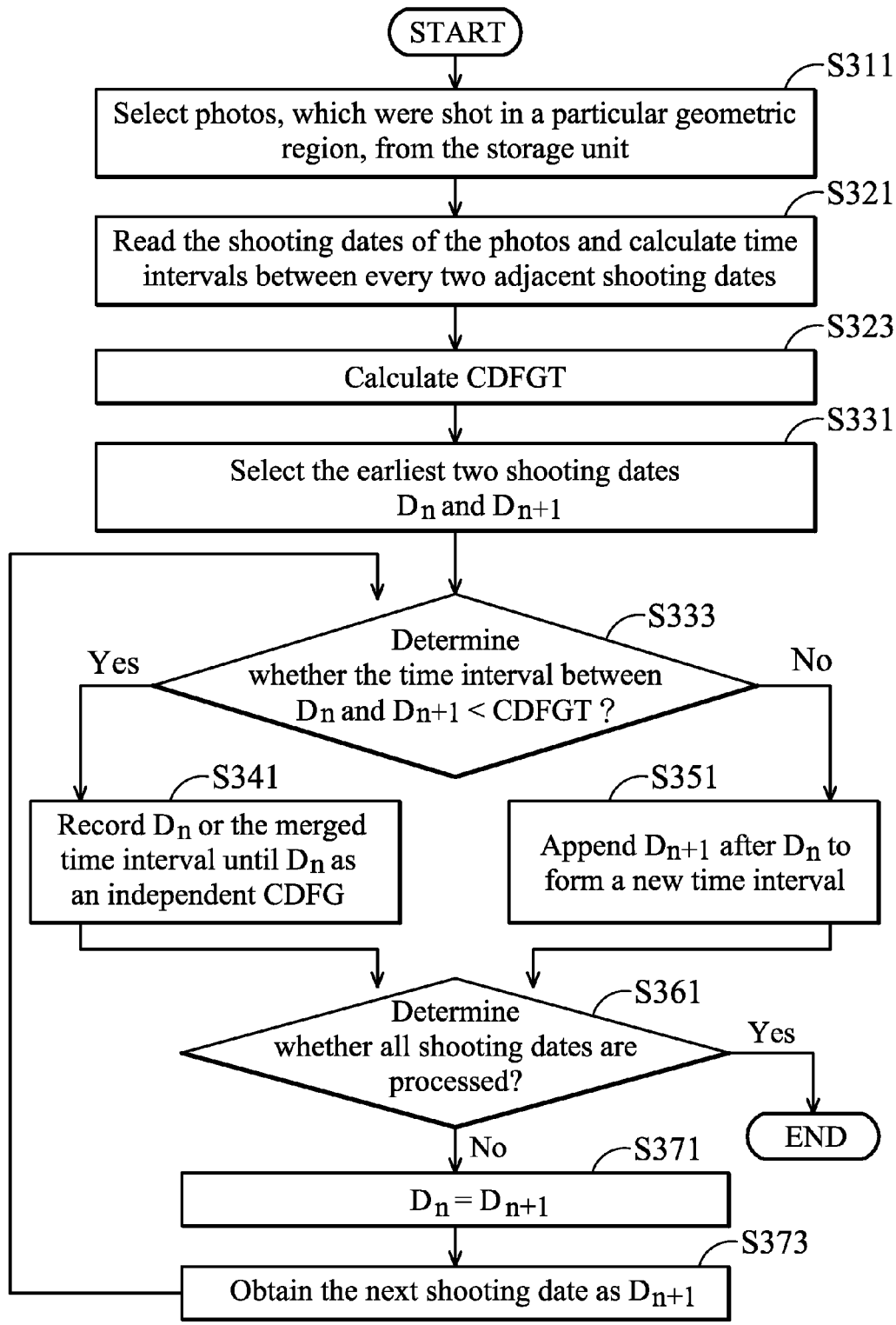
FIG. 3 is a flowchart illustrating a method for the CDFG (Continuous Data-time Fragment Grouping) according to an embodiment of the invention.
Figure 4:
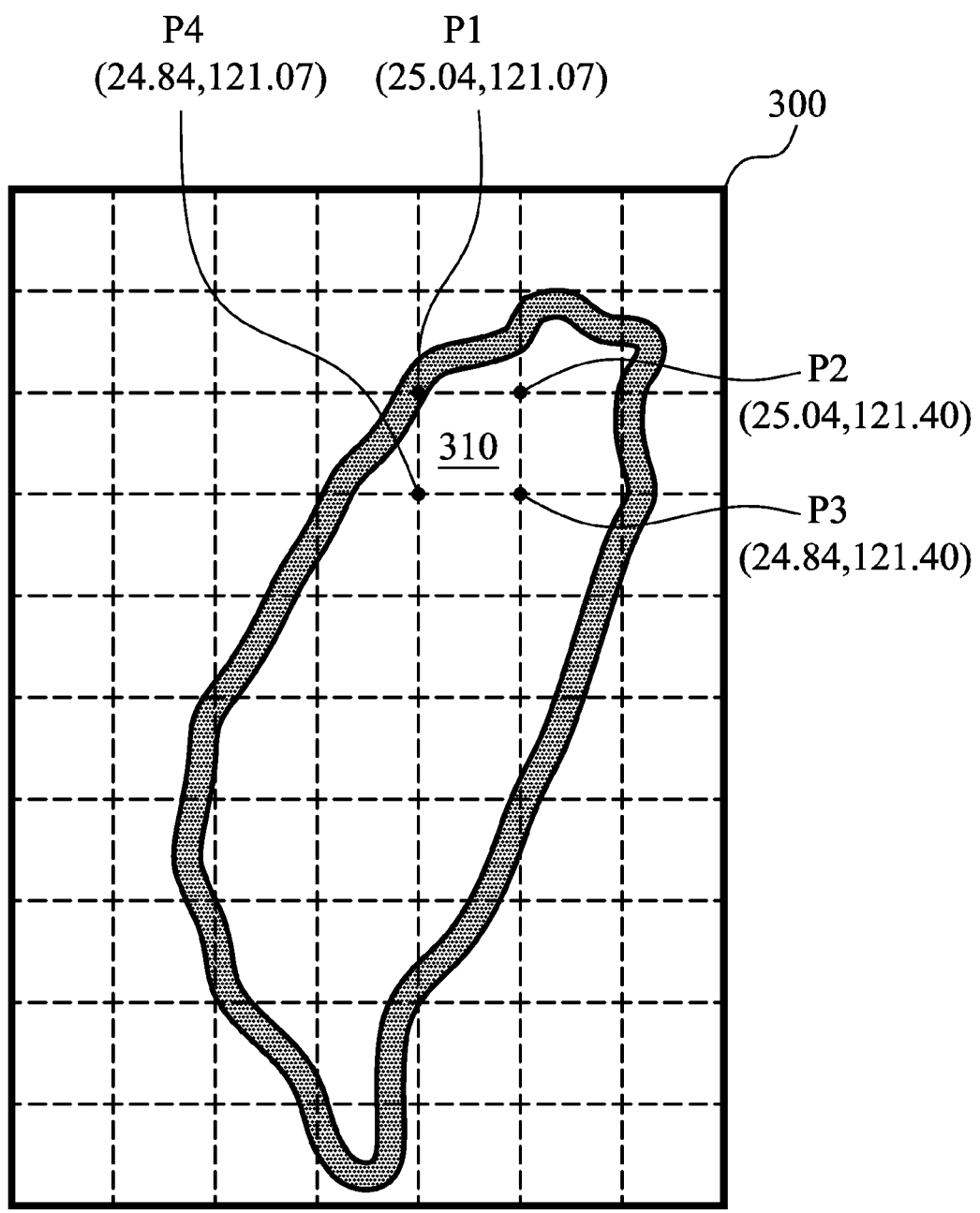
FIG. 4 is a schematic diagram of geometric regions according to an embodiment of the invention.

FIG. 3 is a flowchart illustrating a method for the CDFG according to an embodiment of the invention. The CDFG module 210 selects photos, which were shot in a particular geometric region, from the storage unit 210 (step S311). FIG. 4 is a schematic diagram of geometric regions according to an embodiment of the invention. The display unit 120 displays the map 300 capable of interacting with users, which is divided by rectangles, and each rectangle covers a specified geometric region. For example, the rectangle 310 covers the geometric region surrounded by four terminals P1 to P4 suggesting latitude and longitude of (25.04,121.07), (25.04,121.40), (24.84,121.40) and (24.84,121.07), respectively. After receiving a click signal associated with the rectangle 310, the CDFG module 210 reads out photos, which were shot in the geometric region covered by the rectangle 310, from the storage unit 140 according to the shooting place information. It should be noted that the geometric region covered by the rectangle 310 may not be fixed, but may vary with the user's manipulation. For example, a user may perform a zoom-in gesture on the display unit 120 to make the rectangle 310 cover a narrower geometric region, or the user may perform a zoom-out gesture on the display unit 120 to make the rectangle 310 cover a broader geometric region.

Figure 5A:
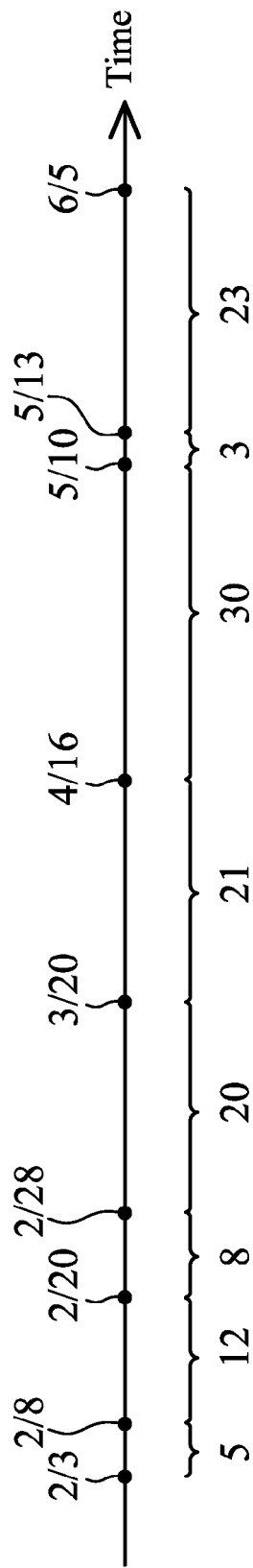
FIG. 5A is a schematic diagram showing the time sequence of shooting dates according to an embodiment of the invention.

However, it may be difficult for users to browse or search photos when the matched photos are numerous. Therefore, the CDFG module 210 applies the CDFG algorithm (as shown in steps S321 to S373) to group photos, which were shot in the geometric region covered by the rectangle 310, according to the shooting time of the photos. Details of the algorithm are further described as follows. The CDFG module 210 reads the shooting dates of the photos, calculates time intervals between every two adjacent shooting dates (step S321), and then calculates the median of the time intervals (step S323). The median may also be referred to as the CDFGT (Continuous Date-time Fragment Grouping Threshold). For example, FIG. 5A is a schematic diagram showing the time sequence of shooting dates according to an embodiment of the invention. After reading the shooting time information of a group of photos, the CDFG module 210 obtains nine shooting dates of the photos, which were shot in the same geometric region, i.e. 2/3, 2/8, 2/20, 2/28, 3/20, 4/10, 5/10, 5/13 and 6/5, from the earliest to the latest, and eight time intervals between every two adjacent shooting dates, i.e. 5, 12, 8, 20, 21, 30, 3 and 23 days, respectively.

The calculated time intervals are sorted in ascending order to be 3, 5, 8, 12, 20, 21, 23 and 30, and therefore, the median of the time intervals is (12+20)/2=16. After selecting the earliest two shooting dates $D_n$ and $D_{n+1}$, such as 2/3 and 2/8 (step S331), the CDFG module 210 repeatedly performs a loop to merge shooting dates until all shooting dates are processed (step S333 to S373). Due to photos with closed shooting dates being typically taken in one journey, the merging results by the CDFG module 210 may satisfy user expectations.

Figure 5B:
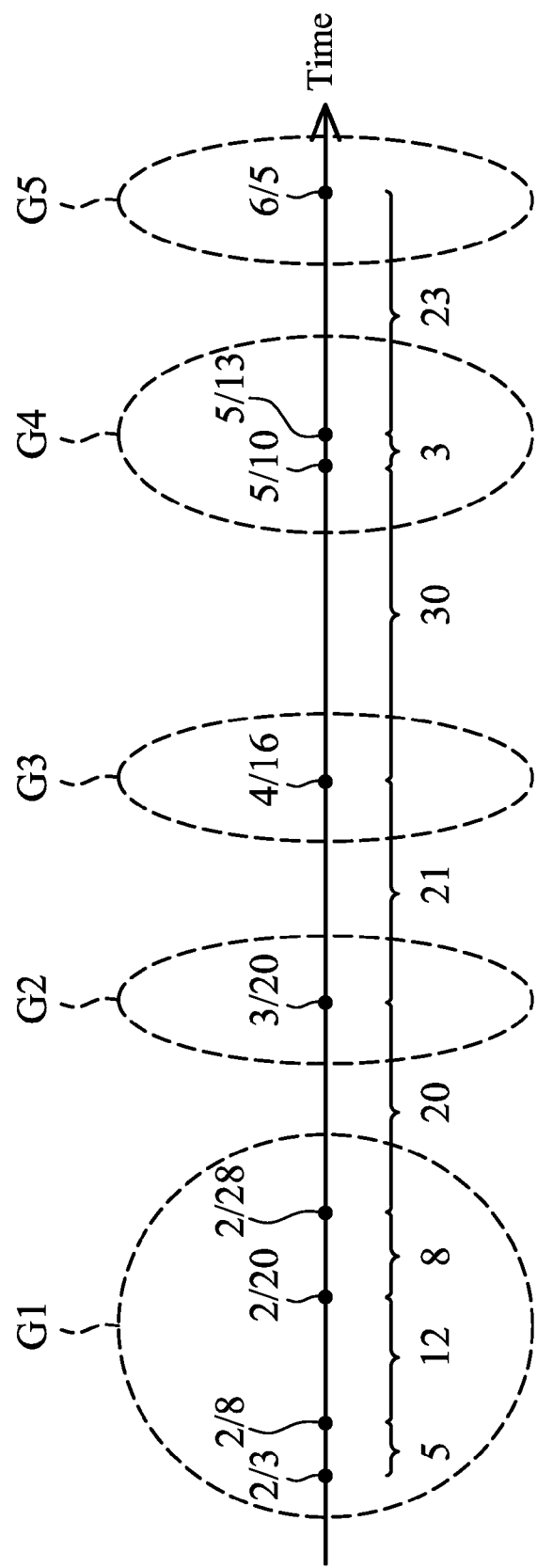
FIG. 5B is a schematic diagram of the time sequence showing merged shooting dates according to an embodiment of the invention.

Details of the merging loop are described as follows. The CDFG module 210 determines whether the time interval between the shooting dates $D_n$ and $D_{n+1}$ is less than the CDFGT (step S333). If so, the shooting date $D_n$ or the merged time interval until the shooting date $D_n$ (that is, a merged time interval) is recorded as an independent CDFG (step S341); otherwise, the shooting date $D_{n+1}$ is appended after the shooting date $D_n$ to form a new time interval (step S351). Following step S341 or S351, the CDFG module 210 determines whether all shooting dates have been processed (step S361). If so, the whole process ends; otherwise, the CDFG module 210 sets (step S371) and obtains the next shooting date as $D_{n+1}$ (step S373). FIG. 5B is a schematic diagram of the time sequence showing merged shooting dates according to an embodiment of the invention. For example, after the whole process ends, the CDFG module 210 obtains five CDFGs G1 to G5 including the time interval 2/3 to 2/28, the date 3/20, the date 4/10, the time interval 5/10 to 5/13 and the date 6/5, respectively. The results are output to the GM module 230.

Figure 6:
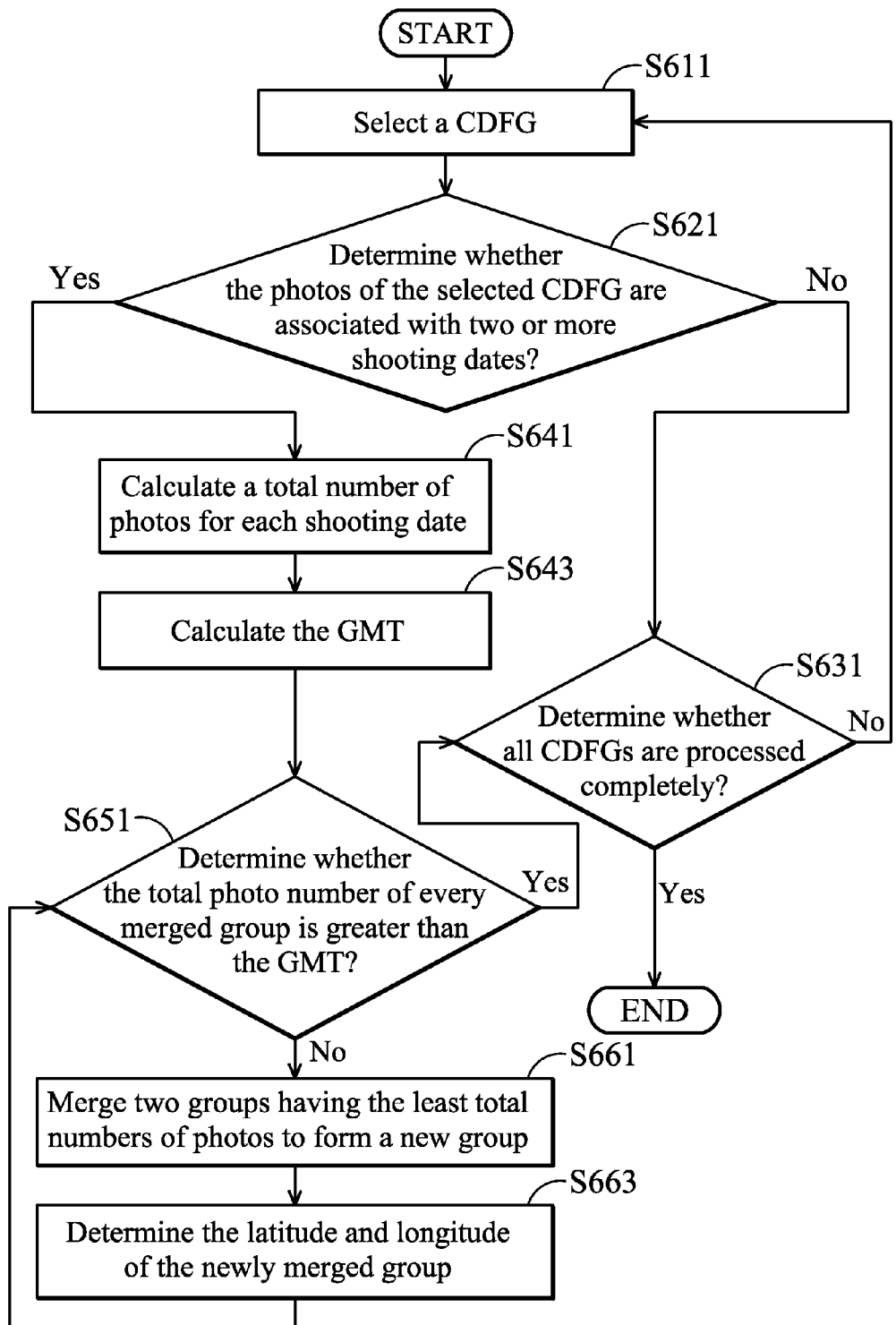
FIG. 6 is a flowchart illustrating a method for the GM (Group Merging) according to an embodiment of the invention.

FIG. 6 is a flowchart illustrating a method for the GM according to an embodiment of the invention. The GM module 230 selects a CDFG (step S611). However, the selected CDFG may cross several shooting dates and total number of photos taken on different shooting dates may vary greatly. The GM module 230 uses the GM algorithm (as shown in steps S621 to S663) to merge the shooting dates with relatively fewer photos together so as to average the total number of photos between the merged groups. It may benefit users by allowing them to browse or search photos easier. Details of the algorithm are further described as follows. The GM module 230 determines whether the photos of the selected CDFG are associated with two or more shooting dates (step S621). If so, operations are performed to, if required, merge photos of the CDFG (steps S641 to S663); otherwise, the GM module 230 determines whether all CDFGs have been processed completely (step S631). After all CDFGs are processed completely (the "Yes" path of step S631), the whole process ends. It should be noted that no merging is needed when the photos of the CDFG are associated with only one shooting date, that is, the photos of the CDFG themselves form an independent group. Otherwise (the "No" path of step S631), the GM module 230 selects the next CDFG to process (step S611).

Figure 7A:
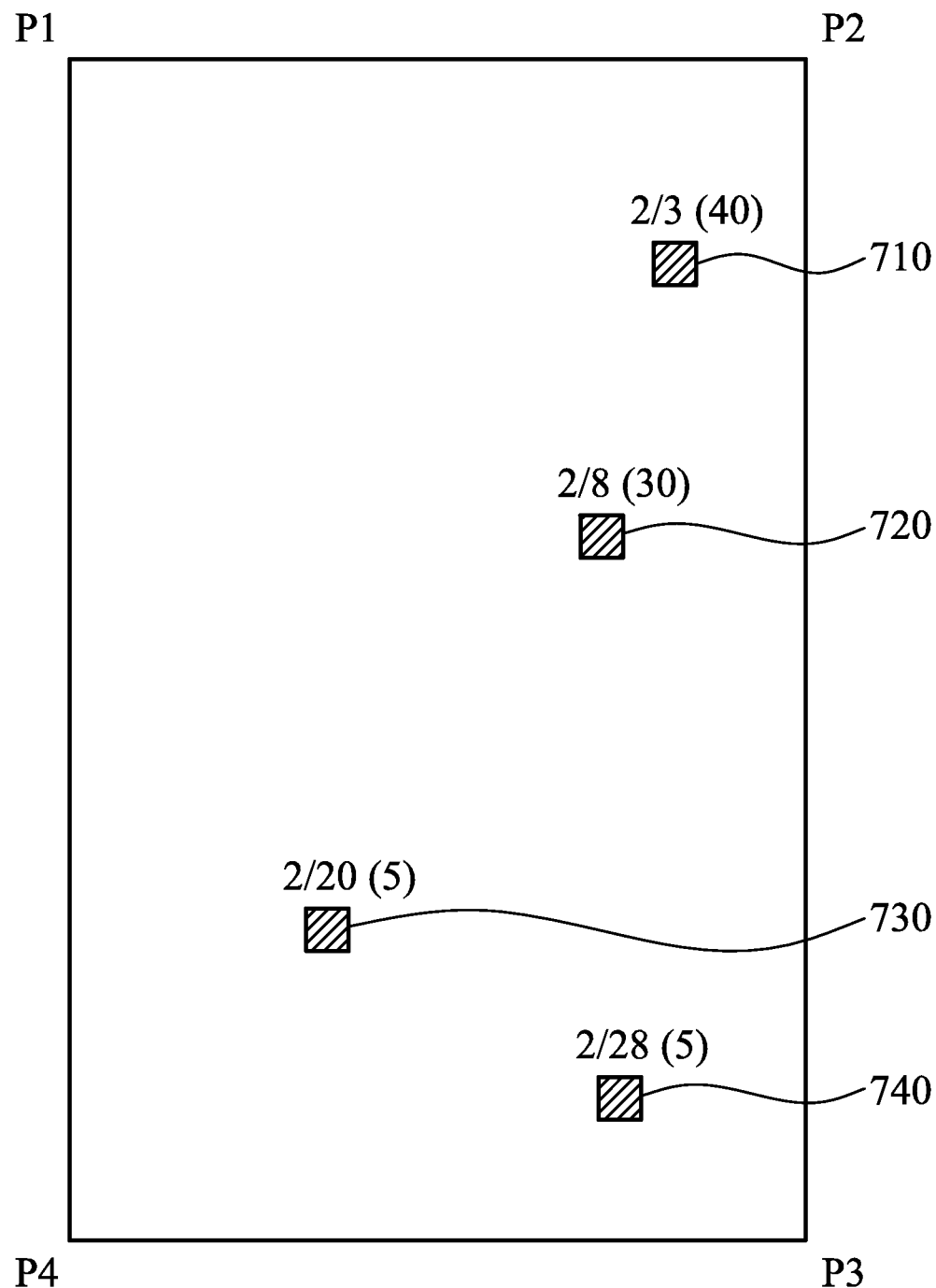
FIG. 7A is a schematic diagram showing the geometric distribution of photo groups according to an embodiment of the invention.

Details of photo merging are described in the following. The GM module 230 calculates the total number of photos for each shooting date (step S641), and the median of the calculated total numbers associated with all shooting dates (step S643). The median may also be referred to as the GMT (Group-Merging Threshold). For example, FIG. 7A is a schematic diagram showing the geometric distribution of photo groups according to an embodiment of the invention. Assume that the CDFG G1 is associated with four shooting dates 2/3, 2/8, 2/20 and 2/28. The photos at the four shooting dates were respectively taken in the places as shown in the shadowed rectangles 710 to 740, and the total number of photoss of the listed shooting dates are 40, 30, 5 and 5 (as quoted and following the date), respectively. The total number of photoss are sorted in ascending order to be 5, 5, 30 and 40, and therefore, the median of the time intervals is (5+30)/2=17.5. The GM module 210 repeatedly performs a loop to merge the shooting dates as groups until all total number of photoss of the merged groups are greater than the GMT (step S651 to S663).

Figure 7B:
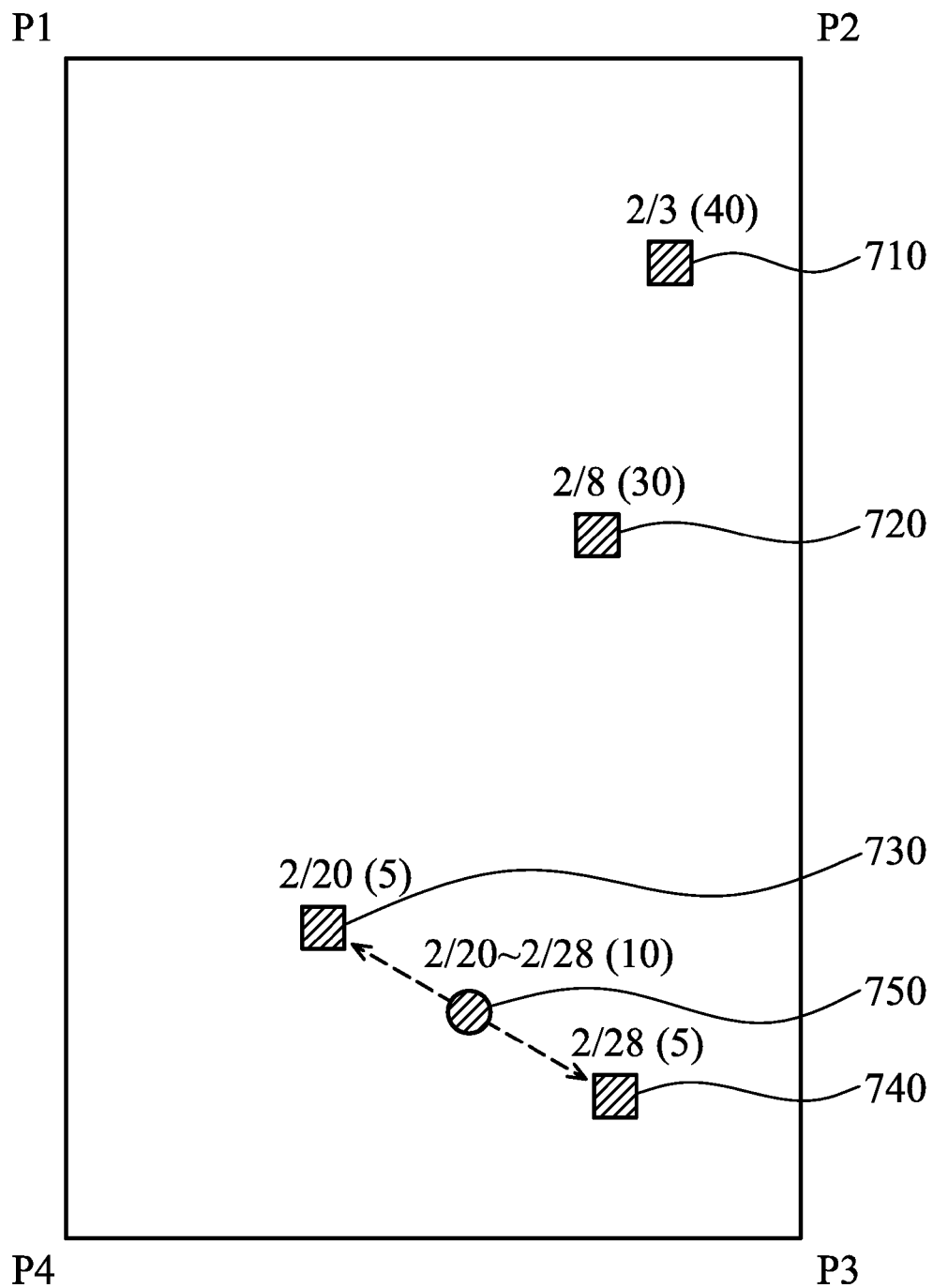
FIG. 7B is a schematic diagram showing the geometric distribution of photo groups after the first merging run according to an embodiment of the invention.
Figure 7C:
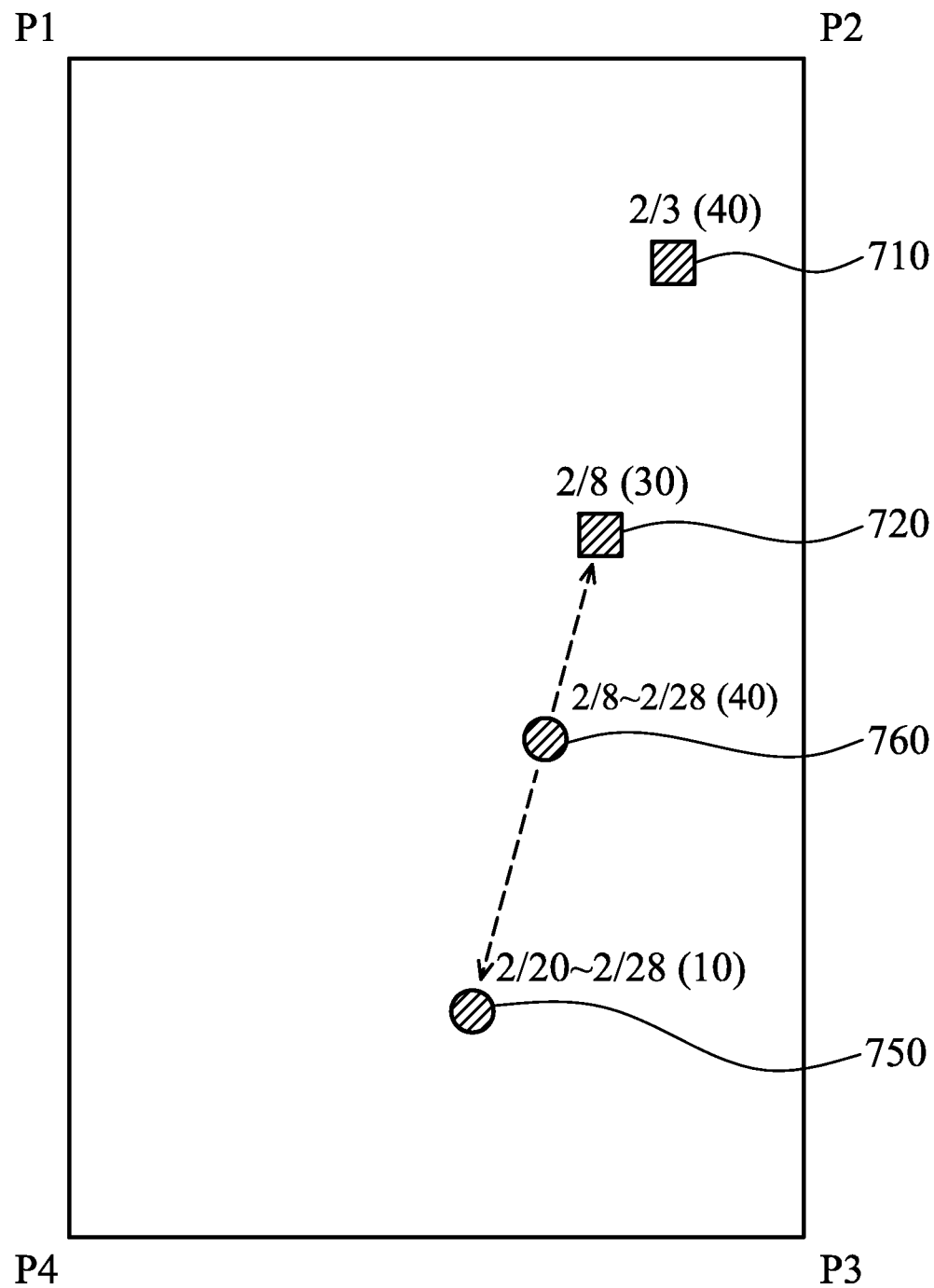
FIG. 7C is a schematic diagram showing the geometric distribution of photo groups after the second merging run according to an embodiment of the invention.

Details of the group-merging loop are described as follows. The GM module 230 determines whether the total number of photos of every merged group is greater than the GMT (step S651). If so, the process proceeds to the determination of step S631; otherwise, two groups having the least total numbers of photos are merged to form a new group, wherein each group may be associated with a shooting date or a shooting time interval (step S661), and the latitude and longitude of the newly merged group is determined (step S663). For example, FIG. 7B is a schematic diagram showing the geometric distribution of photo groups after the first merging run according to an embodiment of the invention. Two groups 730 and 740 having the least total number of photos are merged to form a new group as shown in the shadowed circle 750. The shooting time interval of the new group is 2/20 to 2/28, the total number of photos thereof is 10 (as shown in the quotation) and the determined latitude and longitude thereof is located between the groups 730 and 740. FIG. 7C is a schematic diagram showing the geometric distribution of photo groups after the second merging run according to an embodiment of the invention. Two groups 720 and 750 having the least total numbers of photos are merged to form a new group as shown in the shadowed circle 760. The shooting time interval of the new group is 2/8 to 2/28, the total number of photos thereof is 40 (as shown in the quotation) and the determined latitude and longitude thereof is positioned between the groups 720 and 750. After the process ends, the GM module 230 outputs relevant information regarding groups G2 to G4 and newly merged groups 710 and 760 to the drawing module 250, such as the shooting dates, the shooting time intervals, the total number of photos, the latitude and longitude, etc. The GM module 230 may store the above information in a data table of the storage unit 140 for future reference.

Figure 8:
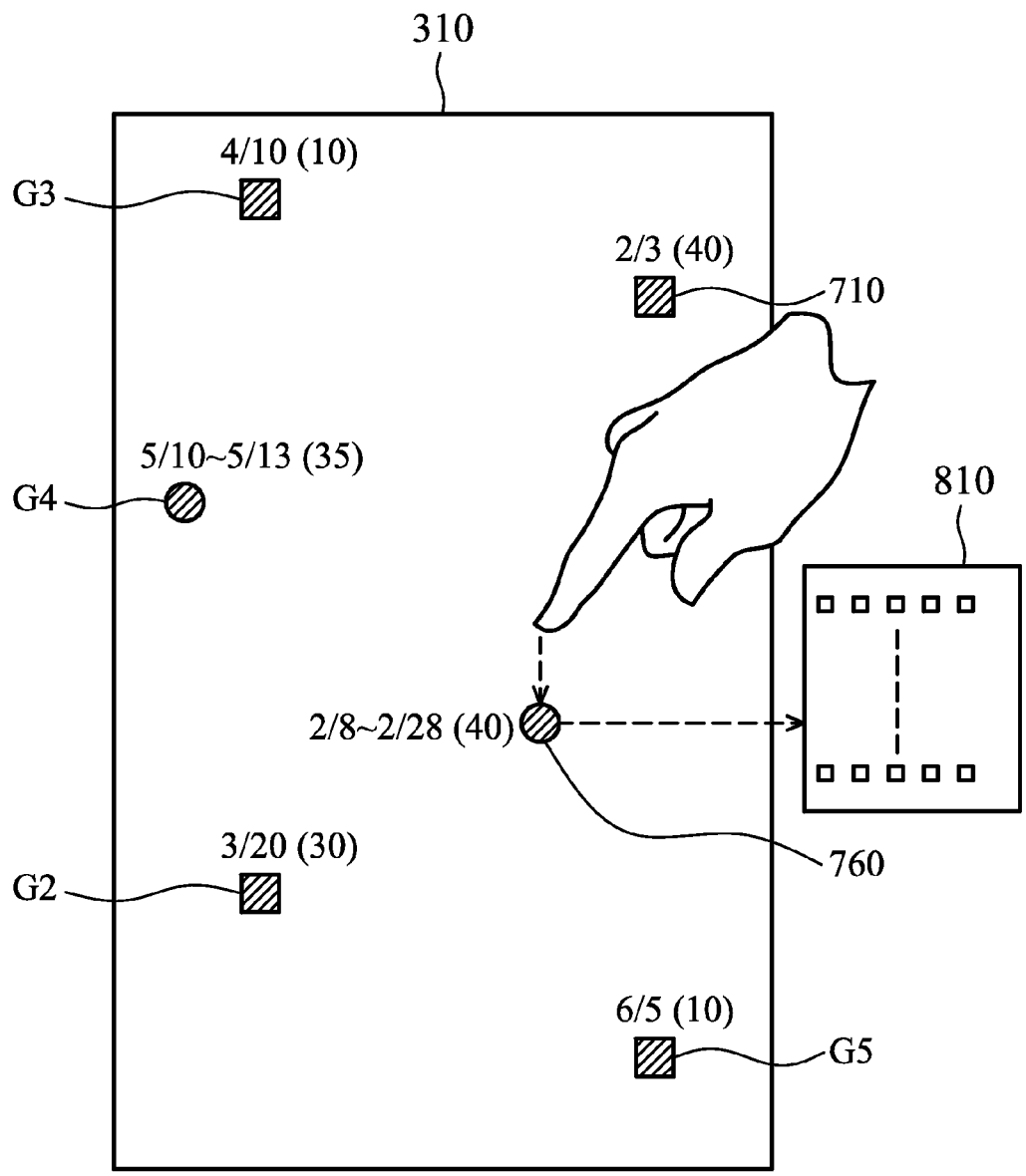
FIG. 8 is a schematic diagram showing the final geometric distribution of merged photo groups according to an embodiment of the invention.

The drawing module 250 draws the map according to the information output from the GM module 230 for users' reference. FIG. 8 is a schematic diagram showing the final geometric distribution of merged photo groups according to an embodiment of the invention. After detecting that a user has clicked a notation on the map, such as the shadowed circle 760, the drawing module 260 draws a screen 810 including thumbnails of all photos shot in the time interval between 2/8 to 2/28 for the user to browse, search and select.

Although the embodiment has been described as having specific elements in FIGS. 1 and 2, it should be noted that additional elements may be included to achieve better performance without departing from the spirit of the invention. While the process flows described in FIGS. 3 and 6 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating and manipulating grouped photos, executed by a processing unit, comprising:
   selecting a plurality of photos shot in a geometric region from a storage unit;
   reading a plurality of shooting dates of the photos;
   calculating a plurality of time intervals between every two adjacent shooting dates;
   generating a plurality of CDFGs (Continuous Data-time Fragment Groupings) according to the time intervals;
   for each CDFG comprising two or more shooting dates, obtaining a total number of photos associated with each shooting date;
   for each CDFG having two or more shooting dates, generating one or more groups according to the total numbers; and
   displaying information regarding the groups in a map displayed on a display unit;
   wherein the step for generating a plurality of CDFGs comprises:
     calculating a first median of the time intervals; and
     merging the two adjacent shooting dates with a time interval being less than the first median in sequence to form the CDFGs.

2. The method of claim 1, wherein each CDFG having only one shooting date forms a group in itself.

3. The method of claim 1, wherein the displayed information comprises a shooting date, a shooting time interval or a total number of photos associated with each group.

4. The method of claim 3, wherein the displayed information is shown by a position indicating a latitude and longitude on the map, and the latitude and longitude is associated with a shooting place of grouped photos.

5. The method of claim 1, wherein a time interval between any of the CDFGs is greater than the first median.

6. The method of claim 5, wherein the step of generating one or more groups according to the total numbers further comprises:
   for each CDFG having two or more shooting dates, calculating a second median of the total number of photos; and
   for each CDFG having two or more shooting dates, merging the shooting dates to generate the groups, thereby enabling the total number of photos associated with each group to be greater than the second median.

7. The method of claim 6, further comprising:
   displaying a notation representing each group in the map; and
   after detecting that one of the notations has been clicked, generating a screen comprising thumbnails of all photos associated with the corresponding group.

8. An apparatus for generating and manipulating grouped photos, comprising:
   a storage unit;
   a display unit; and
   a processing unit, coupled to the storage unit and the display unit, selecting a plurality of photos shot in a geometric region from the storage unit; reading a plurality of shooting dates of the photos; calculating a plurality of time intervals between every two adjacent shooting dates; generating a plurality of CDFGs (Continuous Data-time Fragment Groupings) according to the time intervals; for each CDFG comprising two or more shooting dates, obtaining a total number of photos associated with each shooting date; for each CDFG having two or more shooting dates, generating one or more groups according to the total numbers; and displaying information regarding the groups in a map displayed on the display unit;
   wherein the processing unit calculates a first median of the time intervals, and merges the two adjacent shooting dates with a time interval being less than the first median in sequence to form the CDFGs.

9. The apparatus of claim 8, wherein each CDFG having only one shooting date forms a group in itself.

10. The apparatus of claim 8, wherein the displayed information comprises a shooting date, a shooting time interval or a total number of photos associated with each group.

11. The apparatus of claim 10, wherein the displayed information is shown by a position indicating a latitude and longitude in the map, and the latitude and longitude is associated with a shooting place of grouped photos.

12. The apparatus of claim 8, wherein a time interval between any of the CDFGs is greater than the first median.

13. The apparatus of claim 12, wherein for each CDFG having two or more shooting dates, the processing unit further calculates a second median of the total number of photos; and, for each CDFG having two or more shooting dates, the processing unit merges the shooting dates to generate the groups, thereby enabling the total number of photos associated with each group to be greater than the second median.

14. The apparatus of claim 13, wherein the processing unit further displays a notation representing each group in the map; and, after detecting that one of the notations has been clicked, generating a screen comprising thumbnails of all photos associated with the corresponding group.

15. A method for generating and manipulating grouped photos, executed by a processing unit, comprising:
   displaying a map on a display unit, wherein the map is divided by a plurality of rectangles and each rectangle is associated with a geometric region;
   after detecting that one of the rectangles has been clicked, selecting a plurality of photos, which were shot in the associated geometric region, from a storage unit;
   merging the photos according to a plurality of shooting dates thereof so as to generate a plurality of groups; and
   displaying information regarding the groups to help a user to search and browse photos;
   wherein the step of generating a plurality of groups comprises:
     reading a plurality of shooting dates of the photos;
     calculating a plurality of time intervals between every two adjacent shooting dates;
     generating a plurality of CDFGs (Continuous Data-time Fragment Groupings) according to the time intervals;
     for each CDFG comprising two or more shooting dates, obtaining a total number of photos associated with each shooting date; and
     for each CDFG having two or more shooting dates, generating one or more groups according to the total numbers,
   wherein each CDFG having only one shooting date forms a group in itself;
   wherein the step for generating a plurality of CDFGs comprises:
     calculating a first median of the time intervals; and
     merging the two adjacent shooting dates with a time interval being less than the first median in sequence to form the CDFGs.

16. The method of claim 15, wherein the displayed information comprises a shooting date, a shooting time interval or a total number of photos associated with each group.

17. The method of claim 16, wherein the displayed information is shown by a position indicating a latitude and longitude in the map, and the latitude and longitude is associated with a shooting place of grouped photos.

18. The method of claim 17, further comprising:
  displaying a notation representing each group in the map; and
  after detecting that one of the notations has been clicked, generating a screen comprising thumbnails of all photos associated with the corresponding group.

* * * * *